May 24, 1927.

A. ROSENTHAL 1,629,930

SHAKER TROUGH FOR CORN HUSKERS

Filed Aug. 31, 1926

Inventor:
August Rosenthal
By
Attorneys

Patented May 24, 1927.

1,629,930

UNITED STATES PATENT OFFICE.

AUGUST ROSENTHAL, OF WEST ALLIS, WISCONSIN, ASSIGNOR TO ROSENTHAL MFG. CO., OF WEST ALLIS, WISCONSIN.

SHAKER TROUGH FOR CORN HUSKERS.

Application filed August 31, 1926. Serial No. 132,771.

This invention relates to corn huskers and is particularly directed to a shaker trough for corn huskers associated with the delivery fan in a novel manner.

This invention relates to corn huskers of the type disclosed in my Patent No. 1,531,758 of March 31, 1925 for corn huskers.

In corn huskers as heretofore constructed, it has been the usual practice to provide a shaker trough leading to a delivery fan which delivered the cut material after receiving it through the shaker trough. This shaker trough propelled the cut material in one direction, and the fan due to its direction or rotation caused a reversal of the direction of travel of the material with consequent loss in efficiency and increase in power consumption.

This invention is designed to overcome the defects noted above and objects of such invention are to provide a novel form of corn husker which is so constructed that there is no reversal of direction of travel of the cut material as it passes through the shaker trough to the delivery fan, but in which the material travels in the same direction and is lifted and delivered by the fan with a minimum of expended power and with the utmost efficiency.

Further than this in corn huskers as heretofore constructed it has been necessary to restrict the opening through the bottom screen of the shaker trough so as to localize the suction or draft. With this invention, however, means are provided whereby no restriction of the bottom screen is necessary and in which a maximum sifting of the shelled kernels or grains is secured, and in which a further separation of the grains from any cut material that may fall thereinto is provided.

Further objects are to provide a novel form of end seal or closing means for the fan end of the shaker trough and to so construct this end seal that it is flexible and freely movable to thus permit maximum stroke of the shaker trough without unduly lengthening the machine.

An embodiment of the invention is shown in the accompanying drawings, in which:—

Figures 1, 2:
Figure 1 is a fragmentary, longitudinal, sectional view through the corn husker, such section corresponding to the line 1—1 of Figure 2.
Figure 2 is a sectional view on a line 2—2 of Figure 1.

Referring to the drawings, it will be seen that the corn husker is provided with a compartment 1 which receives the cut material in the usual manner. This compartment has its bottom closed by a shaker trough which is equipped with a main bottom 2 provided with upturned protuberances 3 which are opened at their forward end and slant downwardly and rearwardly. Further this shaker trough is provided with a sifting screen 4 mounted below the main bottom 2. These members 2 and 4 are carried by the side bars 5 and 6 of the shaker trough. It is to be noted from Figure 1 that the shaker trough is mounted for reciprocation upon the swinging pitman or links 7 and 8. Reciprocation is imparted to the trough in any suitable manner as for example by means of the connecting rod or link 9 which may pass to a crank as in the usual construction. The main compartment 1 which receives the cut material laps within the shaker trough as shown in the drawing. For example, this main compartment may be provided with one of the sides 10 which extends inside of the side bar 6 of the trough. The other side may extend down in a similar manner inside the said bar 5, or it may be provided with an apron strip or member 11 which laps within the side bar 5 and is secured to the side 12 of the main compartment as shown most clearly in Figure 2.

It is to be noted from Figure 1 that the side 12 is cut-away adjacent its forward end and that the inner facing of a fan casing or housing 13 closes this cut-away portion of the main compartment. This casing 13 houses a rotary fan consisting of a rotor 14 and a plurality of arms 15. The fan casing merges into a delivery chute 16. Further it is to be noted that the fan casing is provided with a central aperture 17 which opens into the main compartment 1 as shown in Figure 1. The direction of rotation of the fan is indicated by the arrow in Figure 1.

Returning to the shaker trough, it will be seen that it is provided with a downwardly extending head 18 and that the bottom 2 is upwardly curved as indicated at 2'. It is to be noted further from Figure 1 that the end of the main compartment is closed by a downwardly extending partition 19 and that this partition supports a flexible closure plate 20 which is preferably formed of rubber or similar material.

During the reciprocation of the shaker trough the head 18 moves past the normal position of the closure flap 20 and the flap freely flexes or yields and permits itself to be pushed inwardly a slight distance. It will thereafter immediately recover its original position as shown in Figure 1 and maintain the seal or closure for the end of the main compartment adjacent the reciprocatory trough. It will be seen that an extensive sifting surface is afforded by the elongated screen 4 and consequently any kernels or grains that are inadvertently shelled will pass through the openings adjacent the slanting projections 3 and will drop down upon the screen. The shaking of the trough sifts out any grit or dust that may pass with the grains.

Provision is made for a further cleaning or separation of kernels or grains. For example, adjacent the head 18 an outwardly extending member 21 is provided and an intermediate perforated partition 22 is located above the closed bottom 23 of the shaker trough. These members lead into spouts or other means and serve to deliver respectively any cut material that may fall through the main bottom and the grains of corn, the grains of corn passing freely through the apertures in the intermediate partition 22. This effect is enhanced due to the fact that the intermediate partition 22 is provided with a curved portion as indicated at 22' adjacent this front edge so that the grains of corn are compelled to rise over this curved portion and consequently freely fall through the partition apertures. Thus a very sharp and effective separation of the grains of corn is secured by this construction.

It is to be particularly noted that the alternate reciprocations of the trough co-operate with the forwardly slanting projections 3 to feed the cut material forwardly to the fan opening. This forwardly fed material passes into this opening and passes directly upwardly through the chute 16 as indicated by the large arrow in Figure 2. Thus the direction of travel of the cut material is not reversed, as the cut material arrives at the fan. Instead the cut material has generally the same forward direction of travel as it leaves the shaker trough and passes into the fan.

It is to be particularly noted that with this association of parts that it is not necessary to restrict the section opening or entrance opening for the incoming air passing through the fan as has heretofore been considered necessary. The consequence of this construction is therefore that an extensive screen may be provided for sifting out and cleaning the shelled grains of corn so that this action may extend over a considerable length of the shaker trough.

It will be seen, therefore, that a very much more effective separation of grain is secured than has heretofore been possible and it will be seen further that due to the fact that an excessive suction is not required and also due to the fact that the direction of travel of the cut material is not reversed, that a minimum power expenditure is necessary for driving the fan and a more efficient delivery of cut material is secured.

It will be seen further that the apparatus is highly practical and may be readily constructed in a simple and easy manner.

Although the invention has been described in considerable detail, such description is intended as illustrative rather than limiting as the invention may be variously embodied and as the scope of such invention is to be determined as claimed.

I claim:—

1. In a corn husker the combination of a main compartment for the reception of cut material, a shaker trough closing the bottom of said compartment and having forwardly and upwardly extending projections provided with apertures through which the kernels from the corn may fall, a sifting screen mounted below said main bottom, a fan housing having an opening adjacent the forward end of the shaker trough and opening into said main compartment and having a delivery chute extending upwardly from adjacent the forward side of the fan, a rotary fan located within said casing and a hollow delivery head opening into the space between the main bottom and the sifting screen.

2. In a corn husker, the combination of a main compartment for the reception of cut material, said main compartment having an open bottom closed by means of a shaker trough, said shaker trough having a main bottom provided with apertures and with forwardly and upwardly extending projections, means for reciprocating said trough, a sifting screen carried by said trough below said main bottom, a fan casing mounted on a side of said compartment and having an entrance aperture opening into said compartment, said fan casing having a delivery chute extending upwardly from adjacent its forward side, a rotary fan located within said casing, said shaker trough having a forward delivery head opening into the space between said screen and said main bottom, said compartment having a forward end extending downwardly toward said shaker trough and having a flexible closure flap positioned adjacent said head and adapted to be moved by said head when said trough is reciprocated.

3. In a corn husker the combination of a main compartment for the reception of cut material, a shaker trough closing the bottom of said main compartment and having a main bottom provided with upwardly extending projections, slanting toward the forward end of such trough and having apertures adjacent said projection, a sifting screen mounted below said bottom and spaced therefrom and carried by said shaker trough, means for reciprocating said shaker trough, said shaker trough having a head opening into the space between said main bottom and said screen and having an intermediate partition within said head, said partition being apertured to permit the passage therethrough of grains of corn, a fan casing mounted adjacent the forward end of said compartment and having an entrance aperture opening thereinto and having a delivery chute extending forwardly therefrom adjacent the front end of said fan casing, and a rotary fan located within said fan casing.

4. In a corn husker the combination of a main compartment adapted to receive cut material, a shaker trough closing the bottom of said main compartment and having forwardly extending projections and terminating in an upwardly projecting head, means for reciprocating said shaker trough, a fan casing mounted on one side of said main compartment and having an entrance aperture opening into said main compartment adjacent the forward end of said compartment, said fan casing having a delivery head extending upwardly therefrom adjacent the forward side of said casing, a rotary fan located within said fan casing, said shaker trough having an upwardly extending head adjacent its forward end, and a flexible closure plate closing the space between said main compartment and said shaker trough and adapted to be moved by the head of said trough when said trough is reciprocated.

5. In a corn husker, a compartment for receiving material, a fan casing having an opening communicating with said compartment adjacent its front end and a fan rotating in the direction of travel of material in said compartment, and a shaker trough positioned in said compartment for feeding material to said fan, said shaker trough having an opening in said fan casing to discharge material directly into said fan casing from the shaker.

6. In a corn husker, a compartment for receiving material, a shaker trough positioned in said compartment for feeding material to the end thereof, and a fan communicating with the said end of said compartment and rotating in the direction of travel of material in said compartment.

7. In a corn husker, a compartment for receiving material, a fan communicating with the end of said compartment, a shaker trough positioned in the compartment for feeding material to said fan and having one end projecting through the end of said compartment to deliver separated kernels therefrom, and means for closing the end of the compartment through which the shaker projects, and preventing discharge of material from the end of said shaker.

8. In a corn husker, a compartment for receiving material, a fan communicating with the end of said compartment, a shaker trough positioned in the compartment for feeding material to said fan and having one end projecting through the end of said compartment to deliver separated kernels therefrom, and flexible means for closing the end of the compartment through which the shaker projects, and preventing discharge of material from the end of said shaker.

9. In a corn husker, a compartment for receiving material, a fan communicating with the end of said compartment, a shaker trough positioned in the compartment for feeding material to said fan and having one end projecting through the end of said compartment to deliver separated kernels therefrom, said shaker trough having an upturned edge, and means co-operating with said upturned edge to form a closure for the end of the compartment through which the shaker projects.

10. In a corn husker, a compartment for receiving material, and a fan communicating with the front end of said compartment, a shaker trough comprising a plate provided with projections for feeding the material forward and apertures for separating kernels of corn from the material, a sieve positioned below said plate and extending throughout its entire length for cleaning the separated kernels, and a second perforated plate positioned at the front end of said sieve for further separating the kernels of corn from the material discharged upon said sieve.

11. In a corn husker, a compartment for receiving material, a fan communicating with the front end of said compartment for delivering material therefrom, a shaker trough positioned in the compartment and projecting through the front end thereof, said shaker trough comprising a plate having an upturned forward end and provided with projections for feeding the material forward, and apertures for separating kernels of corn from the material, means cooperating with the upturned end of said plate to form a closure for the front end of the compartment through which the shaker projects, and a sieve positioned below said apertured plate and extending throughout its entire length for cleaning the separated kernels of corn discharged thereon.

In testimony that I claim the foregoing I have hereunto set my hand at West Allis, in the county of Milwaukee and State of Wisconsin.

AUGUST ROSENTHAL.